United States Patent Office 3,265,664
Patented August 9, 1966

3,265,664
PARTIALLY CURED EPOXY RESINS
Richard W. Fulmer and Dwight E. Peerman, Minneapolis, Minn., assignors to General Mills, Inc., a corporation of Delaware
No Drawing. Filed Sept. 12, 1963, Ser. No. 308,359
The portion of the term of the patent subsequent to Oct. 26, 1982, has been disclaimed
4 Claims. (Cl. 260—47)

This application is a continuation-in-part of our application Serial No. 274,321, filed April 19, 1963, now abandoned, which in turn is a continuation-in-part of our application Serial No. 49,819, filed August 16, 1960, now abandoned. The latter application is a continuation-in-part of our application Serial No. 744,926, filed June 27, 1958, now abandoned.

The present invention relates to novel compositions of matter containing epoxy resins partially cured with certain guanamines. These partially cured compositions are low molecular weight polymers which are thermoplastic but are capable of rapid reaction at an elevated temperature to an insoluble, infusible polymer.

These partially cured compositions possess certain distinct advantages. Since most epoxy curing systems are reactive at room temperature at least to some degree and react to product cured resins when maintained at room temperature for extended periods of time, it is necessary to maintain the epoxy resin and the curing agents separate until it is desired to effect reaction. The present partially cured products afford a one package curable composition which can be a stable commodity of commerce. Some partially cured or "B stage" epoxy resins have been prepared in the past. These, however, possess various disadvantages. Some of these "B stage" resins, while stable for varying periods of time, are not sufficiently stable or do not have a sufficiently long life and cure too rapidly at elevated temperatures. Other such resins are so extremely slow in reacting that catalysts are required to accelerate reaction in forming the "B stage" resins as well as in final curing. The goal is to achieve a one package curable composition which is stable for extended periods of time at room temperature or slightly elevated temperatures and yet will cure in a reasonable time at high temperatures.

It has now been discovered that certain epoxy resins partially cured with certain guanamines will provide a "B stage" resin which is stable for extended periods of time and yet will react in a reasonable period of time at elevated temperatures to provide an infusible, insoluble finally cured product. These compositions have increased stability or life over known "B stage" resins which cure quickly at highly elevated temperatures. The compositions also cure in a reasonably rapid time period without the use of catalysts in contrast to some "B stage" resins which, although stable for long periods of time, cure so slowly that inordinate curing times are necessary without the use of a catalyst.

It is, therefore, an object of this invention to provide a partially cured epoxy resin which is stable for extended periods but which is capable of rapid reaction at elevated temperatures.

It is also an object of this invention to provide a partially cured epoxy resin having increased stability.

It is also an object of this invention to provide such a resin without the use of catalysts or auxiliary curing agents.

It is also an object of this invention to prepare such a resin without the use of inhibitors or accelerators.

The epoxy resins which may be employed in this invention are the typical commercially available epoxy materials which are complex reaction products of polyhydric phenols with polyfunctional halohydrins.

Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis (p-hydroxy phenyl) propane (bisphenol A), the resin having the following theoretical structural formula,

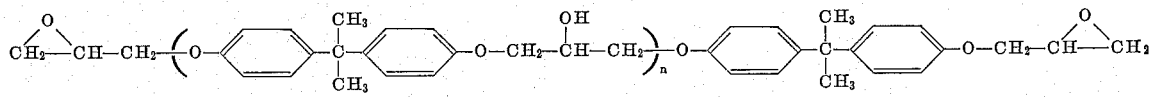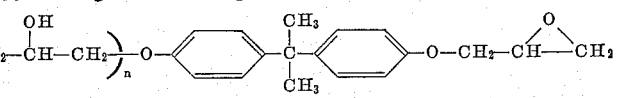

resin which will cure rapidly at elevated temperatures where $n$ is 0 or an integer up to 10. Generally speaking, $n$ will be no greater than 2 or 3 and is preferably 1 or less.

Epoxy resins may be characterized further by reference to their epoxy equivalent, the epoxy equivalent of pure epoxy resins being the mean molecular weight of the resins divided by the mean number of epoxy radicals per molecule, or in any case the number of grams of epoxy resin equivalent to one epoxy group or one gram equivalent of epoxide. Epoxy resinous materials employed in this invention have an epoxy equivalent of about 140 to 2000 and preferably from 140 to 400.

A wide variety of guanamines may be employed in the present invention. They may be illustrated by the following formulae,

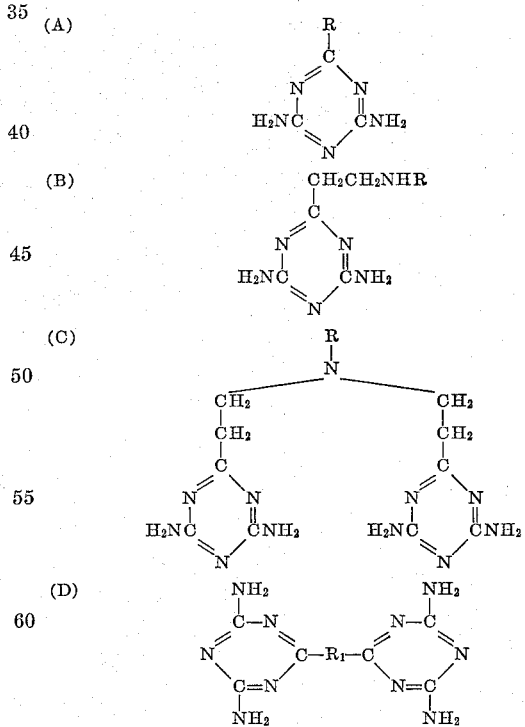

in which R is an aliphatic hydrocarbon group containing from 4 to about 21 carbon atoms and in which $R_1$ is the hydrocarbon group of dimerized unsaturated fatty acids. R preferably contains from 6 to 21 carbon atoms. These guanamines are conveniently made from dicyandiamide and nitriles. Thus the fatty substituted guana mines (A) may be made from fatty nitriles, such as those derived from fatty acids. Compound B may be made from the nitrile RNHCH$_2$CH$_2$CN, which is the acrylonitrile adduct with the fatty amine RNH$_2$. Compound C may be made from the acrylonitrile diadduct of the fatty amine RNH$_2$, RN(CH$_2$CH$_2$CN)$_2$. Compound D may be made from the dinitrile prepared from dimerized fatty acids such as linoleic acid.

Thus, the guanamines employed in the present invention may be prepared from the higher fatty acids containing from 5 to 22 carbon atoms or the polymerized fatty acids as starting materials. The fatty acids employed may be a single isolated fatty acid or may be the mixed fatty acid from a fat or oil or any selected fraction of such fatty acids. Moreover, the acids may be either saturated or unsaturated. In the examples to follow the fatty guanamines derived from the C$_8$–C$_{16}$ acids of coconut oil are referred to as cocoguanamines. In general, in the terminology used herein, the fatty guanamine is identified by the name of the fatty group related back to the source of the fatty acid, e.g., soy, coco, stearo, lauro and the like.

By "B stage" resin is meant a partially cured product which will undergo little or no physical change during extended storage and in which the two reactants are homogeneously compatible in a one component, stable compound ready for final curing at elevated temperatures.

It is difficult to characterize a "B stage" resin. It can generally be described as a partially cured composition which is stable for extended periods of time but is capable of being quickly cured at elevated temperatures. The epoxy/guanamine compositions may be described as proceeding through three stages, A, B and C during the process of curing.

The "A stage" would be a simple blend or mixture of the epoxy resin and guanamine in which essentially no reaction has taken place. Such a simple blend or mixture will be stable for great lengths of time.

The "B stage" is the same resin which has been partially reacted or cured and is quite stable for extended periods of time. The "B stage" resin can be cured at elevated temperatures to yield the finally cured stage, the "C stage" which is an infusible and insoluble polymer.

The "A stage" mixture may, of course, be cured at elevated temperatures to provide an infusible, insoluble polymer. However, longer times for curing are required. The use of a "B stage" resin allows for rapid curing when required and still provides a stable starting material.

"B stage" resins are prepared by heating a mixture of the two constituents to effect partial curing and stopping such curing before the "C stage" is reached. This partial curing can be effected at various temperatures. At higher temperatures, the time of heating becomes short for producing the "B stage" resin and care must be taken that the time is not sufficiently extended so as to result in the "C stage." At lower temperatures, the heating period is slightly longer and more control can be exercised. As a practical matter, the epoxy/guanamine employed in this invention will generally be "B staged" at temperatures in the range of 140 to 170° C. Temperatures outside this range may be used, however, although such may be present some problems. For example, at higher temperatures above 180° C. the time of heating is so short that it is difficult to prevent advancement of the cure to the "C stage" or finally cured state. At temperatures below 100° C. the time of heating is so prolonged as to be impractical or uneconomical. A common temperature used in practice is about 150° C., at which temperature the heating period is sufficiently long to allow for control over the reaction and yet is not an impractical or uneconomical length of time.

As the temperature and period of heating will vary somewhat dependent on the particular epoxy resin, particular guanamine and the proportions thereof, some means of indicating when the "B stage" resin is reached had to be devised. It is, of course, most important that the reaction not be carried out to the point where gelation occurs. One means of avoiding this point of gelation, which can be used during the heating period is the observance of the viscosity of the product. Another is to determine the oxirane oxygen content periodically and observe the rate of change thereof.

In observing the viscosity during heating it will be noted that very little change occurs during the initial heating period. As heating is continued the rate of change in viscosity begins to increase somewhat and just prior to gelation the rate increases very rapidly. When this rate increases greatly the heating must be stopped quickly and the product cooled for gelation would occur in a brief time, a few minutes. This viscosity may be observed during the course of the reaction or first conducted on a small scale to obtain some indication of the approximate time of heating.

In the oxirane oxygen test, samples are withdrawn periodically and the oxirane oxygen content determined by titration with HBr in acetic acid. Since HBr titrates both the oxirane oxygen of the epoxy resin and the amine of the guanamine a value is obtained representing the total of these two. The amine contribution remains constant since primary amines continue to titrate even after reaction with oxirane oxygen. Thus, any decrease in titration results may be attributed to the disappearance of oxirane oxygen. Again the rate of change of oxirane oxygen content is low at first, begins to increase somewhat as the reaction proceeds and then increases quite rapidly. As the rate becomes rapid, the gelation point is close at hand and the reaction is stopped.

Thus "B stage" resins may be prepared by heating the mixture of components at temperatures of from about 100 to 210° C., preferably 140 to 170° C., so as to cause partial curing. Thereafter the heating should be stopped and the reaction mixture should be cooled before final curing occurs so that a partially cured resin results. The termination point may be determined by observation of the viscosity and oxirane oxygen content. In general, a "B stage" resin will exist when the reaction is from about 5 to 90% complete based on the disappearance of oxirane oxygen. As a practical matter the preferred "B stage" resins are those in which the reaction is from about 15 to 50% complete, the most desirable being about 25 to 40% complete.

For purposes of illustration a mixture of 17 parts by weight of cocoguanamine and 83 parts by weight of an epoxy resin derived from bisphenol A an epichlorohydrin having an epoxy equivalent weight of about 190 were partially cured at 150° C. to produce a "B stage" resin. The two components were mixed and heated to the "B staging" temperature, 150° C., over a period of about one hour during which little if any reaction occurred. At this point heating was continued at the "B staging" temperature and the viscosity and oxirane oxygen content observed as described above. The results are as shown in the table below wherein 0 time is the time when the temperature of 150° C. was initially reached and the percent oxirane is the apparent oxirane content which includes the small, constant contribution of the guanamine of about 0.9%.

TABLE I.—B STAGING TEMPERATURE OF 150° C.

| Time (Minutes) | Viscosity (Centipoises) | Apparent Percent Oxirane |
|---|---|---|
| 0 | 40 | 7.71 |
| 10 | 40 | 7.71 |
| 20 | 30 | 7.64 |
| 30 | 60 | 7.40 |
| 40 | 90 | 7.09 |
| 50 | 80 | 6.89 |
| 60 | 80 | 6.33 |
| 70 | 90 | 6.02 |
| 80 | 280 | 5.46 |
| 84 | 480 | 5.14 |

As is apparent from the foregoing table, the increase in viscosity and decrease in oxirane oxygen occurs slowly initially and then occurs at a quickening rate until gelation occurs. The heating must be terminated prior to (71° C.). The following Table II will serve to illustrate the stability of various ratios of epoxy resins and fatty guanamines. The epoxy resin was the one used previously and the fatty guanamine was cocoguanamine.

TABLE II

| Composition (percentage cocoguanamine in total composition) | Condition of sample after aging at 71° C., (Hours) (Tested at 24° C.) | | | | | |
|---|---|---|---|---|---|---|
| | 24 | 36 | 65 | 129 | 151 | 245 |
| 75% | Cloudy, soft | Hard (no longer thermoplastic). | | | | |
| 25% | Clear, soft | Clear, soft | Clear, somewhat harder. | Clear | Clear, hard (not thermoplastic). | V. hard (Barcol=53). |
| 22.5% | do | | | Clear, soft | Clear, sl. harder | Clear, very hard (Barcol=50) not thermoplastic. |
| 20% | do | | | do | do | Clear, very hard (Barcol=51) not thermoplastic. |
| 17.5% | do | | | do | do | Clear, hard (Barcol=48-52) not thermoplastic. |
| 15% | do | | | do | do | Hard, clear (Barcol=53) not thermoplastic. |
| 10% | Clear, fluid | | | Clear, fluid | Clear, soft | Clear, sl. harder, not thermoplastic (Rex hardness=95 Shore "A"). | gelation to provide a "B stage" resin. At 150° C. the most practical "B stage" area for the particular mixture is achieved after heating in excess of 70 minutes at which point the viscosity increases rapidly. At this point (70 minutes) the apparent oxirane content is 6.02% (true oxirane—5.12%). The original apparent oxirane content was 7.71% (actual—6.81%) so that the oxirane oxygen content has fallen 1.69% which represents about 24.8% completion. Gelation occurred shortly after 84 minutes before another sample could be obtained. At 84 minutes the reaction was about 38% complete. In this instance therefore the most practical "B stage" resin is one in which the partial curing is carried out to from about 24 to 38%.

At a temperature of 140° C., gelation occurred at 130 minutes. At 75 minutes the apparent oxirane content was 6.8% and at 105 minutes was 5.8% which represents a degree of completion of from about 13.4% to about 28%. At a temperature of 160° C. gelation occurred shortly after 30 minutes, at which time the apparent oxirane content was 1.5% which represents a degree of completion of about 90%. At 15 minutes the apparent oxirane oxygen content was 6.5% which represents a degree of completion of about 17.8%. At this temperature it is apparent that control of the point of termination is difficult because of the rapid change in rate of curing. In general, it is difficult to provide resins which are partially cured in excess of 50% as the rate of curing is so rapid it is difficult to terminate the reaction in sufficient time to prevent gelation.

These epoxy guanamine compositions have a threshold curing temperature of near 120° C. At temperatures below this, the compositions are quite stable for extended periods of time even at temperatures considerably warmer than room temperature. For example, a "B stage" resin of 996 parts of an epoxy resin derived from bisphenol A and epichlorohydrin having an epoxy equivalent weight of about 190 with 204 parts of cocoguanamine which was prepared by heating at 150° C. for 60 minutes did not cure until 94 hours at 71° C. at which time it had a Barcol hardness of 45. In contrast to this, a "B stage" resin prepared from aromatic curing agents cured in a matter of hours at 71° C. At room temperature the "B stage" resins are stable for long periods of time, in excess of 6 months, but are capable of curing to a final, infusible, insoluble polymer in a short period at temperatures in excess of 120° C.

The stability is maintained over a wide range of proportions of the fatty guanamines and epoxy resin. While stability is shortened with increased amounts of the fatty guanamine, amounts as high as 75% guanamine based on the total weight of guanamine and epoxy resin remained uncured (not finally cured) after 25 hours at 160° F.

This property of epoxy guanamine blends to remain unreacted at lower temperatures makes possible several useful areas for these compositions. There has been a continual search for long pot life for epoxy compositions with which to formulate molding compounds, adhesives, potting compounds, and fiberglass laminates. With the present invention it is possible to make compositions containing the two constituents and have them remain uncured for long periods of time even at temperatures considerably higher than room temperature. At the same time these compositions may be cured at temperatures around 150° C. to yield solid, rigid plastic materials which are infusible and insoluble in organic solvents. The cured blend is hard, tough, impact resistant, and has good adhesive properties.

The following examples will serve to illustrate the utility of the present compounds as molding compounds, adhesives and the like. Since the properties of the finally cured product do not depend on whether a "B stage" resin was first produced or whether the mixture of the epoxy resin and fatty guanamine was heated directly to the cured stage, "B stage" resins were not first produced in all the examples. However, it is understood that with any of the materials in the examples, "B stage" resins could be made initially as previously described prior to their use as molding compounds, adhesives and the like.

*Example I*

Soy guanamine was blended with an epoxy resin (condensation product of bisphenol A and epichlorohydrin having an epoxy equivalent of 200) in a ratio of 30 parts of guanamine to 70 parts of epoxy resin. After curing for three hours at 160° C. the rigid cured plastic had a Barcol hardness of 70. It had a heat distortion temperature (ASTM 648-41T) of 55° C., a tensile strength (ASTM D638-42T) of 4,200 p.s.i., a flexural strength (ASTM D638-42T) of 10,200 p.s.i. and resisted the impact of a steel sphere weight 6½ pounds when dropped from a height of three feet. (Mil-I-16923B.)

*Example II*

An adhesive was formulated using three parts of the soy guanamine of Example I with seven parts of the epoxy resin of Example I and two parts of aluminum oxide as inorganic filler. This mixture was applied to adhesive specimens of 24 ST aluminum and of naval brass. After curing eight hours at 150° C. the adhesives had the following properties. On aluminum the adhesive averaged 3,200 p.s.i. in tensile shear strength (Mil-A-5090B [Para. 4.3.2.1]).

*Example III*

A peel strength adhesive was formulated using equal parts of the soy guanamine of Example I with the epoxy resin of Example I. This mixture was dissolved in organic solvents used to impregnate 181 fiberglass cloth so that the resulting dried resin on the cloth was 50% of the total weight. The resulting impregnated cloth was laid between copper foil of 1½ mils thickness and epoxy-fiberglass laminate. It was cured under 300 p.s.i. pressure at 150° C. for 32 hours. When tested in accordance with a NEMA standard the adhesive had the peel strength of 16½ pounds per inch.

*Example IV*

A blend of an epoxy resin made from bisphenol A and epichlorohydrin and having an epoxy equivalent of 190 and a guanamine of Formula A derived from hydrogenated tallow fatty acids and tabular alumina filler was made and used to bond 24 ST aluminum. The ratio was 80:20:50 in parts by weight respectively. This bond was found to have a tensile shear strength of 1600 p.s.i. after curing the adhesive for four hours at 150° C.

*Example V*

To 85 parts by weight of the epoxy resin of Example IV were added 15 parts by weight of the guanamine prepared from the mixed $C_6$–$C_{10}$ acids of coconut oil. (A portion of this blend was cured at 150° C. for four hours after which it had a Barcol hardness of 68 and heat distortion temperature of 97° C.) After blending thoroughly, the remainder, 50 parts by weight of tabular alumina T–60, was added, and the mixture applied to clean 24 ST aluminum. After curing for four hours at 150° C. and cooling to 23° C. the bond had a tensile shear strength of 2400 p.s.i. After being subjected to 80 inch pounds of impact the bonds still retained 1150 p.s.i. of tensile shear strength. The bond strength was measured at 121° C. at which temperature it retained a tensile shear strength of 1900 p.s.i.

*Example VI*

Twenty grams of hydrogenated tallow guanamine were added to 80 grams of the epoxy resin of Example IV. When a sample of this blend was cured it had a hardness of 68 and a heat distortion temperature of 91° C. To 100 parts of the above blend were added 20 parts of a kaolin type clay comprising largely aluminum and silicon oxides. After curing between clean plates of 24 ST aluminum for four hours at 150° C. the bond strength was measured and found to be 2100 p.s.i. in tensile shear.

*Example VII*

A molding compound was prepared using 80 parts by weight of the epoxy resin of Example IV, 20 parts by weight of lauro guanamine, 20 parts by weight of a kaolin type clay, and 20 parts by weight of hammermilled glass fibers.

The epoxy and guanamine were first milled with the clay on a 3 roll mill. The glass fibers were then added and milled to produce a tacky solid mass. This compound is stable for several months at room temperature.

The mass was heated at 150° C. for seventy minutes to advance the cure. At this point it was a dry solid which could readily be broken up into a molding powder. It is still readily moldable at about 175° C. and will cure in 5 to 10 minutes to a hard, strong plastic with good structural properties.

A flat panel of plastic sheet thus formed was tested with the following results:

| | |
|---|---|
| Flexural ultimate, p.s.i. | 20,000 |
| Flexural ultimate after 2 hours in boiling water, p.s.i. | 10,000 |
| Flexural modulus, p.s.i. | 67,000 |
| Barcol hardness | 90 |
| Heat distortion temperature, ° C. | 96 |

*Example VIII*

Thirty parts by weight of dimer guanamine (having the formula D above in which $R_1$ is the hydrocarbon residue of dimerized linoleic acid) were reacted with 70 parts by weight of the epoxy resin of Example IV and cured for 7½ hours at about 188° C. The cured product had a heat distortion temperature of 77° C., a Barcol hardness of 71, a flexural strength of 13,900 p.s.i. and a tensile shear when acting as the adhesive between 24 ST aluminum of 2200 p.s.i.

*Example IX*

Fifteen parts by weight of a guanamine having the formula C above in which R is $C_{12}H_{25}$ were reacted with 85 parts by weight of the epoxy resin of Example IV at 150° C. for four hours to yield a product having a heat distortion temperature of 107° C., a Barcol hardness of 76, and a flexural strength of 6000 p.s.i.

*Example X*

One part by weight of a guanamine having the formula B above in which R is $C_{18}H_{37}$ was reacted with 3 parts by weight of the epoxy resin of Example IV at 150° C. for four hours to yield a product having a heat distortion temperature of 49° C., a Barcol hardness of 41 and a flexural strength of 9900 p.s.i.

*Example XI*

Twenty parts by weight of cocoguanamine were reacted with 80 parts by weight of epoxy resin of Example I at 121° C. for 21 hours to yield a product having a heat distortion temperature of 92° C., a Barcol hardness of 65, a flexural strength of 21,500 p.s.i., a tensile shear strength, when acting as the adhesive between 24 ST aluminum of 3000 p.s.i., a pot life at 121° C. for 8 hours, a cure time to a maximum heat distortion temperature of 20 hours at 121° C. for 10 hours at 149° C. and an exotherm at a starting temperature of 113° C. or 277° C.

The following examples will serve to illustrate the "B stage" resins from guanamines other than those defined by Formula A.

*Example XII*

To 700 grams of the epoxy resin of Example IV were added 300 grams of dimer guanamine (having the Formula D in which $R_1$ is the hydrocarbon residue of dimerized linoleic acid). These reactants were heated to 150° C. and maintained there for 60 minutes during which period samples were withdrawn for oxirane oxygen determination and viscosity measurements were made. Immediately after reaching 150° C. the oxirane oxygen content was 6.7%. After 20 minutes it was 6.4%, after 40 minutes 6.0%, and after 60 minutes it was 5.6%.

During this period the viscosity went from 34 cps. at the end of 30 minutes to 46 cps. at the end of 60 minutes. The material gelled shortly after this. It became a hard, infusible, insoluble solid having a Barcol hardness of 55.

*Example XIII*

Five hundred grams of a blend of 85% by weight of the epoxy resin of Example IV and 15% by weight of a guanamine having Formula C in which R is $C_{12}H_{25}$ were heated to 150° C. and maintained there for twenty minutes. Immediately after reaching 150° C. the oxirane oxygen content was 7.1%. After 10 minutes it was 6.3%, after 15 minutes it was 6.1% and after 20 minutes it was 5.8%.

The viscosity immediately upon attaining 150° C. was 60 centipoises. After 10 minutes it was 100 cps., after 15 minutes it was 230 cps. and after 20 minutes it was 330 cps.

This product was applied as an adhesive to 24 ST aluminum and cured 4 hours at 177° C. It had a tensile shear strength of 3380 p.s.i. on specimens 1" wide, overlapped ½".

While various modifications of the invention have been described, it is to be understood that the same is not limited thereto but may be varied within the scope of the following claims.

The embodiments of the invention in which an exclusive property or privilege is claimed are defined as follows:

1. A process of producing a heat curable composition stable for extended periods of time at room temperature comprising: (I) reacting at temperatures of from about 100 to 210° C. (1) a polyglycidyl ether of a polyhydric phenol having an epoxy equivalent weight of from about 140–2000 with (2) a guanamine in an amount sufficient to cure said polyglycidyl ether to an infusible, insoluble polymer, said guanamine being selected from the group consisting of (A) 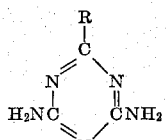

(B) 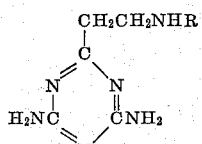

(C) 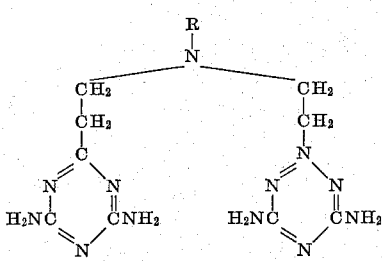

and (D) 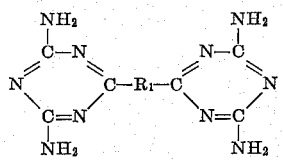

where R is an aliphatic hydrocarbon group containing from 4 to about 21 carbon atoms and $R_1$ is the divalent hydrocarbon group of dimerized fatty acids, said dimerized fatty acids having been prepared by polymerizing fatty acids of 5 to 22 carbon atoms; and (II) terminating the reaction by cooling the reaction mixture below 100° C. when 5 to 90% complete as determined by the decrease in oxirane oxygen content of the reaction mixture.

2. The process of claim 1 wherein the reaction is terminated (II) by cooling the reaction mixture below 100° C. when 15 to 50% complete as determined by the decrease in oxirane oxygen content of the reaction mixture.

3. The process of claim 1 wherein the guanamine is employed in an amount of from 10 to 75% by weight, based on the total amount of the polyglycidyl ether and guanamine.

4. A process of producing a heat curable composition stable for extended periods of time at room temperature comprising: (I) reacting at temperatures of from about 100 to 210° C. (1) a polyglycidyl ether of a polyhydric phenol having an epoxy equivalent weight of from about 140–2000 with (2) a guanamine in an amount sufficient to cure said polyglycidyl ether to an infusible, insoluble polymer, said guanamine having the formula:

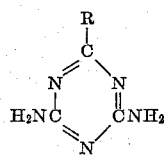

where R is an aliphatic hydrocarbon group having from 4 to about 21 carbon atoms; and (II) terminating the reaction by cooling the reaction mixture below 100° C. when 5 to 90% complete as determined by the decrease in oxirane oxygen content of the reaction mixture.

References Cited by the Examiner

UNITED STATES PATENTS

| | | | |
|---|---|---|---|
| 2,606,904 | 8/1952 | Kaiser | 260—249.9 |
| 2,801,229 | 6/1957 | De Hoff et al. | 260—47 |
| 2,824,078 | 2/1958 | Mellick | 260—28 |
| 2,928,811 | 3/1960 | Belanger | 260—47 |

FOREIGN PATENTS 133,819   8/1949   Australia.

OTHER REFERENCES

Lee et al.: "Epoxy Resins," pp. 52–53 relied on, McGraw-Hill Book Co., Inc., New York, 1957.

Lee et al.: "Epoxy Resins," page 110 relied on, McGraw-Hill Book Co., Inc., N.Y., 1957.

SAMUEL H. BLECH, *Primary Examiner.*

WILLIAM H. SHORT, *Examiner.*

T. D. KERWIN, *Assistant Examiner.*

UNITED STATES PATENT OFFICE
CERTIFICATE OF CORRECTION

Patent No. 3,265,664                                        August 9, 1966

Richard W. Fulmer et al.

It is hereby certified that error appears in the above numbered patent requiring correction and that the said Letters Patent should read as corrected below.

Column 1, line 31, for "product" read -- produce --; column 2, line 20, strike out "resin which will cure rapidly at elevated temperatures" and insert the same before "without" in line 1, same column 2; column 3, line 62, strike out "be"; column 5, line 75, for "25" read -- 24 --.

Signed and sealed this 1st day of August 1967.

(SEAL)
Attest:

Edward M. Fletcher, Jr.                                    EDWARD J. BRENNER

Attesting Officer                                                    Commissioner of Patents